United States Patent
Kashyap (10) Patent No.: US 8,712,998 B2
(45) Date of Patent: *Apr. 29, 2014

(54) DEADLINE-DRIVEN PARALLEL EXECUTION OF QUERIES

(75) Inventor: Sujatha Kashyap, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,831

(22) Filed: Aug. 22, 2012

(65) Prior Publication Data

US 2013/0080418 A1  Mar. 28, 2013

Related U.S. Application Data

(63) Continuation of application No. 13/246,294, filed on Sep. 27, 2011.

(51) Int. Cl.
*G06F 17/30* (2006.01)
(52) U.S. Cl.
USPC .......................................................... 707/719
(58) Field of Classification Search
USPC .................... 707/719, 999.002, 718
See application file for complete search history.

(56) References Cited

U.S. PATENT DOCUMENTS

| | | | |
|---|---|---|---|
| 5,325,525 A | 6/1994 | Shan et al. | |
| 5,742,806 A | 4/1998 | Reiner et al. | |
| 6,938,035 B2 * | 8/2005 | Driesch et al. | 1/1 |
| 7,127,449 B2 | 10/2006 | Barsness et al. | |
| 7,379,953 B2 | 5/2008 | Luo et al. | |
| 7,448,022 B1 | 11/2008 | Ram et al. | |
| 7,552,115 B2 | 6/2009 | Kalach et al. | |
| 7,778,998 B2 * | 8/2010 | Gupta | 707/714 |
| 7,877,373 B2 * | 1/2011 | Zait | 707/713 |
| 7,925,648 B2 * | 4/2011 | Barsness et al. | 707/720 |
| 8,271,651 B1 * | 9/2012 | Wang et al. | 709/226 |
| 8,352,517 B2 * | 1/2013 | Park et al. | 707/809 |
| 8,572,068 B2 * | 10/2013 | Graefe et al. | 707/718 |
| 2004/0122802 A1 * | 6/2004 | Allen et al. | 707/999.003 |
| 2005/0192937 A1 | 9/2005 | Barsness et al. | |
| 2005/0267878 A1 * | 12/2005 | Mogi et al. | 707/999.003 |
| 2007/0250470 A1 * | 10/2007 | Duffy et al. | 707/999.002 |
| 2008/0288446 A1 | 11/2008 | Hu et al. | |
| 2008/0301124 A1 * | 12/2008 | Alves et al. | 707/999.005 |
| 2009/0083215 A1 * | 3/2009 | Burger | 707/999.002 |

(Continued)

OTHER PUBLICATIONS dBforums, How to change Query Timeout?, post#5 Feb. 10, 2005. Retrieved on Apr. 8, 2013 from http://www.dbforums.com/microsoft-sql-server/1115272-how-change-query-timeout.html.*

(Continued)

*Primary Examiner* — Cam-Linh Nguyen
(74) *Attorney, Agent, or Firm* — DeLizio Gilliam, PLLC (57) ABSTRACT

A method includes receiving a query for data, the query including a deadline for completion. The method includes determining a plurality of access plans for the query. The method includes selecting an access plan from the plurality of access plans, wherein the access plan is selected according to an execution time for the access plan that indicates the query can be completed prior to the deadline for completion and wherein the access plan is selected to provide a lowest resource usage among access plans that can be completed prior to the deadline for completion.

8 Claims, 5 Drawing Sheets

(56) References Cited

U.S. PATENT DOCUMENTS

| | | |
|---|---|---|
| 2009/0094192 A1 | 4/2009 | Bestgen et al. |
| 2009/0132488 A1* | 5/2009 | Wehrmeister et al. . 707/999.003 |
| 2009/0172674 A1 | 7/2009 | Bobak et al. |
| 2009/0198666 A1* | 8/2009 | Winston et al. ........ 707/999.005 |
| 2009/0327214 A1 | 12/2009 | Richardson et al. |
| 2011/0010359 A1* | 1/2011 | Burger .......................... 707/718 |

OTHER PUBLICATIONS

Kinil Kirov, How to set a timout for MySQL query using C API, stackoverflow, posted Nov. 23, 2010. Retrieved on Apr. 8, 2013 from http://stackoverflow.com/questions/4254059/how-to-set-a-timeout-for-mysql-query-using-c-api.*

U.S. Appl. No. 13/264,294, filed Sep. 27, 2011, Kashyap, Sujatha.

"U.S. Appl. No. 13/246,294 Office Action", Dec. 7, 2012, 32 pages.

* cited by examiner

DEADLINE-DRIVEN PARALLEL EXECUTION OF QUERIES

RELATED APPLICATIONS

This application claims the priority benefit of U.S. patent application Ser. No. 13/246,294 filed Sep. 27, 2011.

BACKGROUND

Embodiments of the inventive subject matter generally relate to the field of databases, and, more particularly, to executing queries in parallel according to a deadline for query completion.

Many applications access one or more databases as part of their operation. In general, database management systems are designed to provide a quick response to requests to store or retrieve information. For example, most databases allow for parallelization of query execution, especially for applications that require access to large amounts of data. During parallel query execution, the database management system arranges for multiple threads to process portions of the query in parallel with one another. Each parallel thread processes a share (fraction) of the total data and a query coordinator thread joins the partial results provided by the parallel threads to form a final result that is returned to the user. A query optimizer may determine the number of parallel threads used for a query. The query optimizer makes decisions on how to apportion parts of the query to parallel threads with a goal of producing the result in the shortest amount of time. In other words, the degree of parallelism is calculated to minimize the overall query execution time.

While such optimization is beneficial in cases where a user or process is waiting for the results of a query, there can be a large cost in terms of resources (processors, memory etc.) that are used in order to provide the degree of parallelism utilized in current database management systems.

SUMMARY

A method includes receiving a query for data, the query including a deadline for completion. The method includes determining a plurality of access plans for the query. The method includes selecting an access plan from the plurality of access plans, wherein the access plan is selected according to an execution time for the access plan that indicates the query can be completed prior to the deadline for completion and wherein the access plan is selected to provide a lowest resource usage among access plans that can be completed prior to the deadline for completion.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

In general, the embodiments execute queries such that the query is completed using a low amount of system resources while still completing the query prior to a user or application specified deadline. This is in contrast to current systems, which generally seek to complete queries with a lowest possible response time and typically have high resource requirements. For example, the embodiments may execute queries using few or no parallel threads thereby reducing the processor load on a system. Thus the queries can be executed such that the query has a low impact on other applications that may be sharing resources of a system. An example of such a resource sharing environment is a cloud based system.

Figure 1:
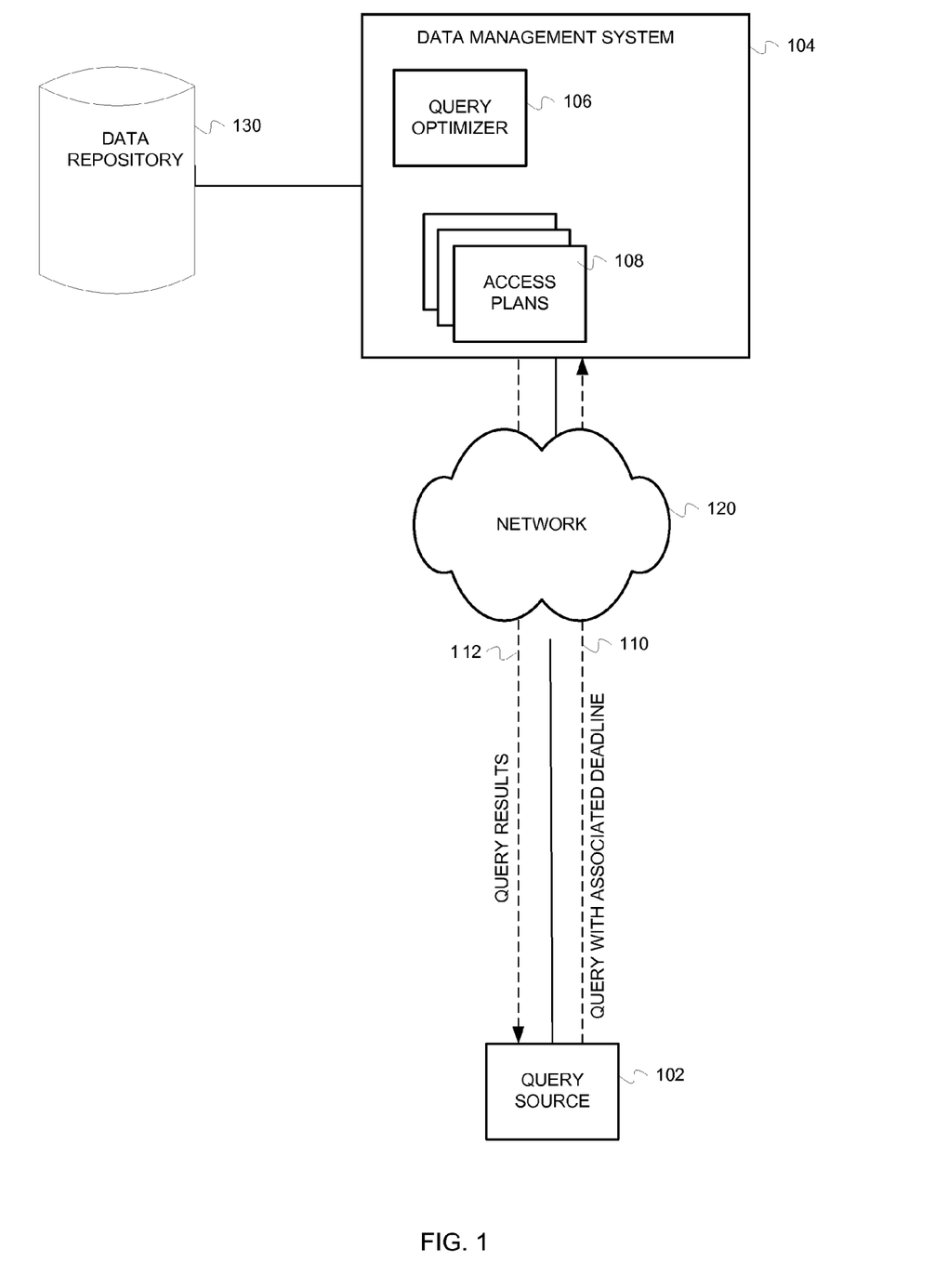
FIG. 1 depicts an example system for providing deadline driven execution of queries.

FIG. 1 depicts an example system 100 for providing deadline driven execution of queries. In some embodiments, system 100 includes a data management system 104 and a query source 102. Data management system 104 and query source 102 may be communicably coupled through network 120. Network 120 may be any type of communications network or collection of networks, including local area networks, wide area networks and the Internet.

Data management system 104 manages one or more data repositories 130. Data management system 104 responds to requests to create, read, update or delete data in a repository 130. In some embodiments, data management system may be a relational database system. In alternative embodiments, data management system 104 may be a hierarchical database or an object oriented database. The inventive subject matter is not limited to any particular type of database. Although one data repository is illustrated in FIG. 1, data management system 104 may access more than one repository 130. Further, repositories may be distributed across multiple systems or servers.

Query source 102 is any application or service that is a source of one or more queries 110 to create, read, update or delete data in data repository 130. In some embodiments, query source 102 is a data analytics application. Examples of such data analytics programs include programs that generate reports on a periodic basis, such as daily, weekly or monthly reports. Unlike transaction processing applications, data analytics applications typically are not response-time sensitive, instead they are driven by a desired deadline to complete. Thus in some embodiments, a query 110 submitted by query source 102 may have a deadline associated with the query. The deadline specifies a time by which the query must be completed. In some embodiments, the deadline may be specified as a query parameter. For example, the deadline may be specified as part of an SQL (Structured Query Language) query or as a parameter of an API (Application Program Interface) function that supplies queries to the data management system 102.

Upon receiving a query from query source 102, a query optimizer 106 of data management system 104 creates one or more access plans 108 for the query. An access plan is a sequence of operations that are performed to complete the query. The operations may include disk reads, summations, joins, index accesses and other operations that are executed in order to provide a result of the query. Portions of the access plan may be capable of being executed in parallel. For example, the data management system may perform disk reads that access different portions of the data scanned as part of the query in parallel. Different access plans typically provide different levels of parallelism. Query optimizer 106 estimates an execution cost for each operation in the access plan and uses the estimated execution cost for each operation to determine an overall cost for the access plan. The execution cost in some embodiments comprises a time to execute the operation. In alternative embodiments, other cost units may be used such as processor utilization, memory utilization, network utilization, disk utilization or combination thereof. In the absence of a deadline parameter, the query optimizer then uses the overall execution cost to select an access plan that is used to actually execute the query. For example, the query optimizer may select a plan with a high degree of parallelism that provides the lowest overall cost (in terms of time) for the access plan. The access plan is then executed by the data management system 104 and the results 112 returned to the query source 102.

Figure 2:
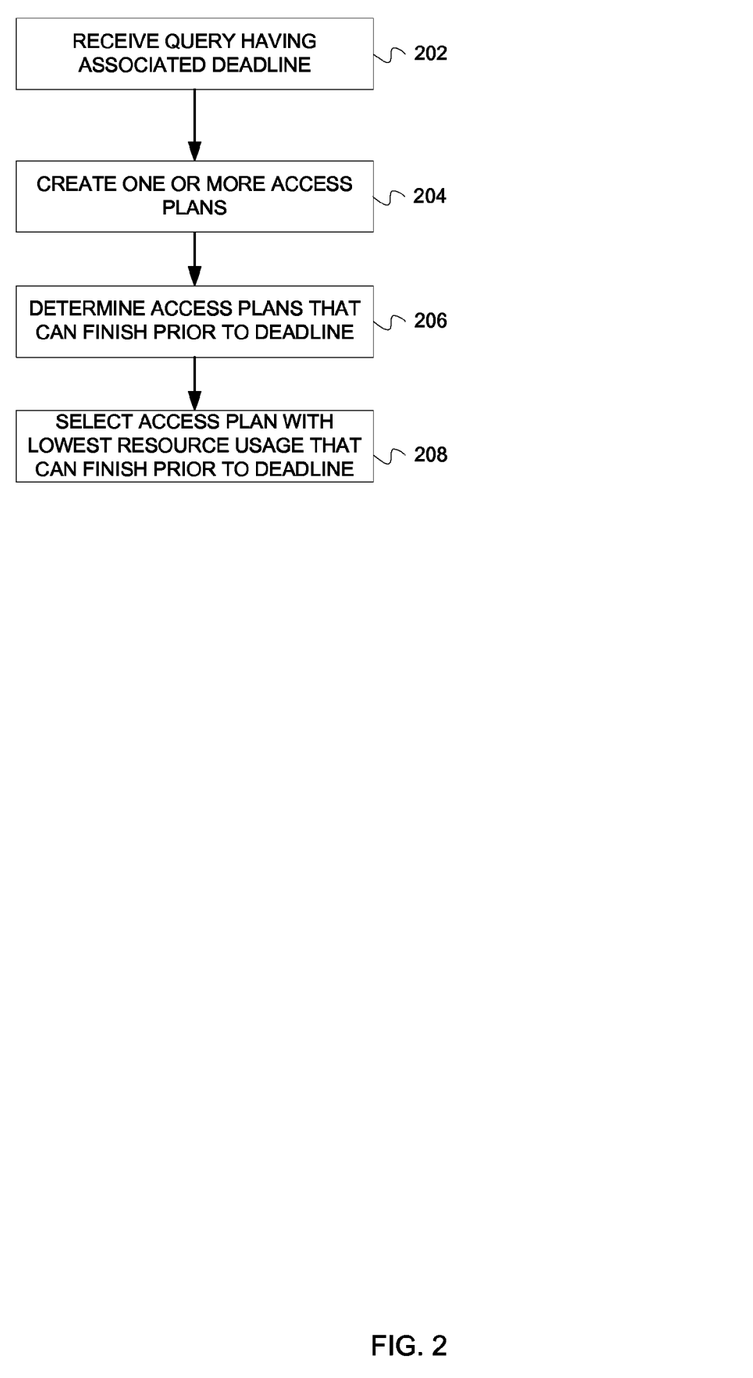
FIG. 2 is a flowchart depicting an example method for providing deadline driven execution of queries according to embodiments.
Figure 3:
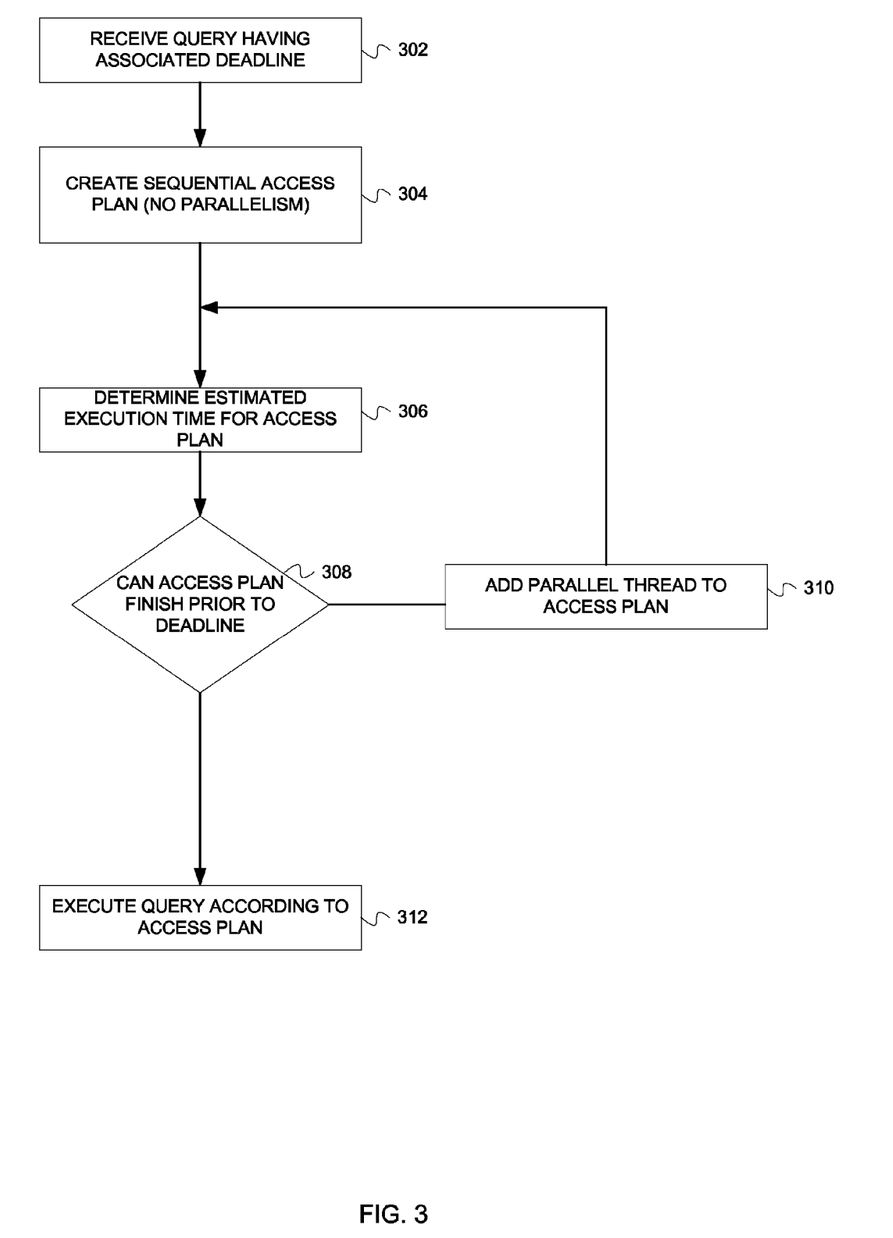
FIG. 3 is a flowchart depicting an example method for providing deadline driven execution of queries according to alternative embodiments.
Figure 4:
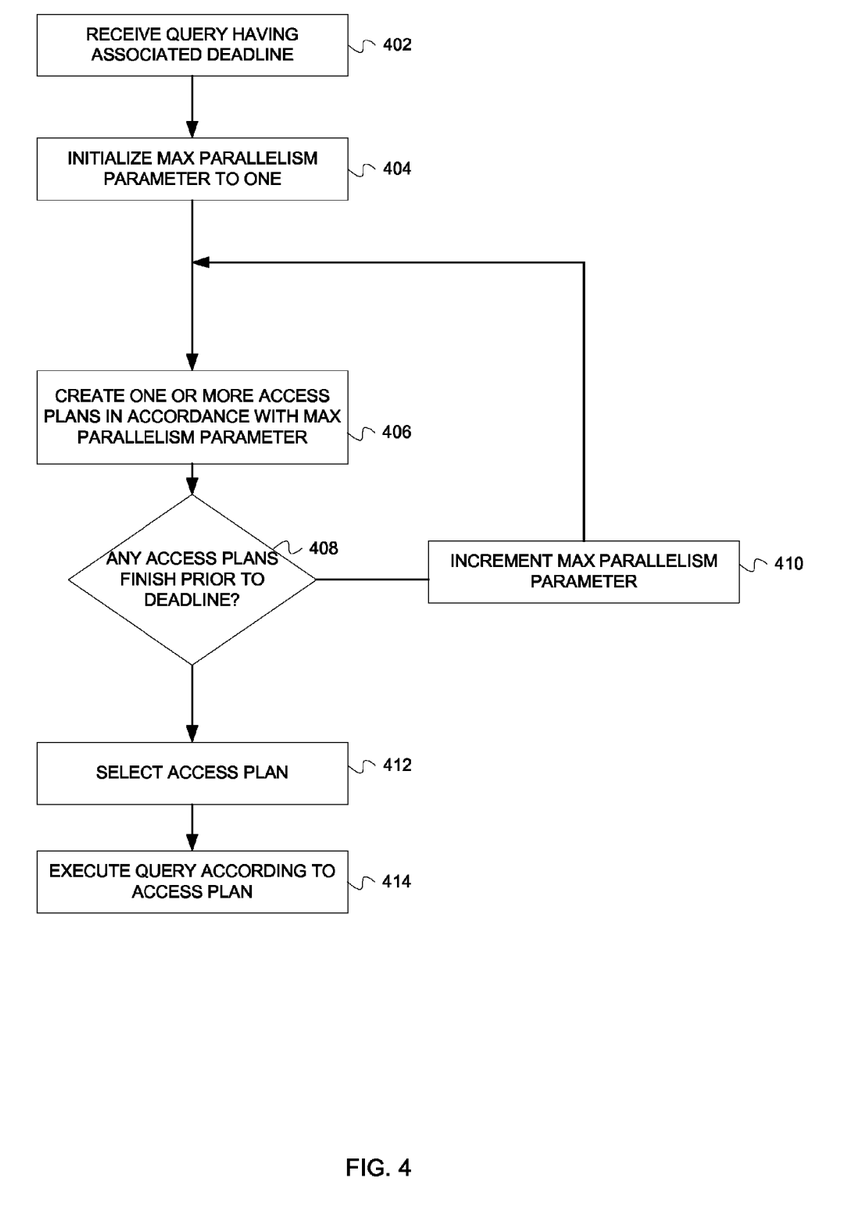
FIG. 4 is a flowchart depicting an example method for providing deadline driven execution of queries according to further alternative embodiments.

FIGS. 2-4 provide further details of the operation of system 100 when a deadline is provided as a parameter of a query.

FIG. 2 is a flowchart depicting an example method 200 for providing deadline driven execution of queries according to embodiments. Method 200 begins at block 202 when a data management system 104 receives a query having an associated deadline. As discussed above, in some embodiments the deadline may be specified within an SQL statement. In alternative embodiments, the deadline may be specified as a parameter for a query function of an API of the data management system.

At block 204, query optimizer 106 creates one or more access plans that include operations that are executed in order to provide a response to the query. The access plans may have varying degrees of parallelism such that some of the operations are completed by threads that execute in parallel with one another. In addition, as discussed above, the query optimizer may estimate an execution cost for the access plan. The execution cost may include execution time and may further include resource usage for the access plan such as process usage, memory usage, disk usage or network usage.

At block 206, query optimizer 106 determines which of the access plans created at block 204 can be completed before the deadline associated with the query. The estimated execution time determined for the access plan can be used to determine if the access plan can finish before the deadline. Access plans that cannot be completed before the deadline are removed from further consideration. If none of the access plans can be completed prior to the deadline, the data management system 104 may return an error indicator to query source 102.

At block 208, query optimizer 106 selects an access plan that can be completed prior to the deadline and that has a lowest resource usage when compared to other access plans that can be completed prior to the deadline. Various factors may be used to determine which access plan has the lowest resource usage. For example, in some embodiments, the access plan that has the lowest parallelism may be selected. In alternative embodiments, the access plan with the lowest processor usage, disk usage, memory usage or network usage may be selected. The query optimizer may use various combinations of factors, and may associate weightings with the factors to determine the access plan with the lowest resource usage. The selected access plan is then executed by the data management system 104 and the results of the query are returned to the query source 102.

FIG. 3 is a flowchart depicting an example method 300 for providing deadline driven execution of queries according to embodiments. Like method 200 above, method 300 begins at block 302 by receiving a query with an associated deadline.

At block 304, the query optimizer creates a sequential access plan for the query. A sequential access plan is an access plan where each of the operations in the plan is executed one after the other, with none of the operations taking place in parallel with one another.

At block 306, the query optimizer determines an estimated execution time for the current access plan.

At block 308, the query optimizer determines, using the estimated execution time, if the current access plan can be completed prior to the deadline associated with the query.

If the current access plan cannot be completed prior to the deadline, then the query optimizer proceeds to block 310, where the query optimizer adds a parallel thread to the access plan. The query optimizer then returns to block 306 to determine an estimated execution time for the updated access plan and whether the updated access plan can be completed prior to the deadline. In some embodiments, the data management system 104 may have a maximum degree of parallelism. If a new thread cannot be added without exceeding the maximum degree of parallelism, the data management system may return an error indication to the query source indicating that the query cannot be completed prior to the deadline.

Blocks 306-310 can be repeated to add parallelism to the access plan until the access plan can be completed prior to the deadline. When the check at block 308 determines that the current access plan can be completed prior to the deadline, the current access plan is executed at block 312 and the results are returned to the query source.

FIG. 4 is a flowchart depicting an example method 400 for providing deadline driven execution of queries according to further alternative embodiments. Like methods 200 and 300, method 400 begins at block 402 by receiving a query having an associated deadline from a query source.

At block 404, the query optimizer initializes a maximum resource usage parameter. In some embodiments, the maximum resource usage parameter is a maximum parallelism parameter, which is initialized to one. The maximum parallelism parameter, as noted above, is a parameter used by data management systems to determine the maximum number of threads that can be executing at the same time in order to perform operations for the query.

At block 406, the query optimizer creates access plans in accordance with the current maximum parallelism parameter. In the initial pass, a sequential access plan may be created when the maximum parallelism parameter is set to one.

At block 408, the query optimizer determines, using the estimated execution time of the access plans created at block 406, if any of the access plans can be completed prior to the deadline associated with the query.

If none of the access plans can be completed prior to the deadline, then the query optimizer proceeds to block 410, where the query optimizer increments the maximum parallelism parameter. Increasing the maximum parallelism parameter allows the query optimizer to create access plans having more parallelism than in the previous iteration. The query optimizer then returns to block 406 to create a new set of access plans in accordance with the updated maximum parallelism parameter and to further determine whether any of the new access plans can be completed prior to the deadline.

Blocks 406-410 can be repeated until at least one access plan can be completed prior to the deadline.

When the check at block 408 determines that at least one access plan can be completed prior to the deadline, the system proceeds to block 412 to select an access plan from the set of access plans that can be completed prior to the deadline. If more than one access plan can be completed prior to the deadline using the current maximum parallelism parameter, then the query optimizer selects one of the access plans for execution. The access plan may be selected according to other resource usage parameters such as processor usage, disk usage, memory usage, network usage or a combination thereof.

At block 414, the data management system 104 executes the query using the selected access plans. The results of the query are then returned to the query source 102.

Method 400 has been described as starting from a low degree of parallelism (one) and working towards a higher degree of parallelism until an access plan is found that can be executed such that the query completes before the desired deadline. Those of skill in the art having the benefit of the disclosure will appreciate that in alternative embodiments, the system may start with a high degree of parallelism and decrease the maximum parallelism allowed for an access plan until one or few access plans are created that can be used to execute the query prior to the desired deadline.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
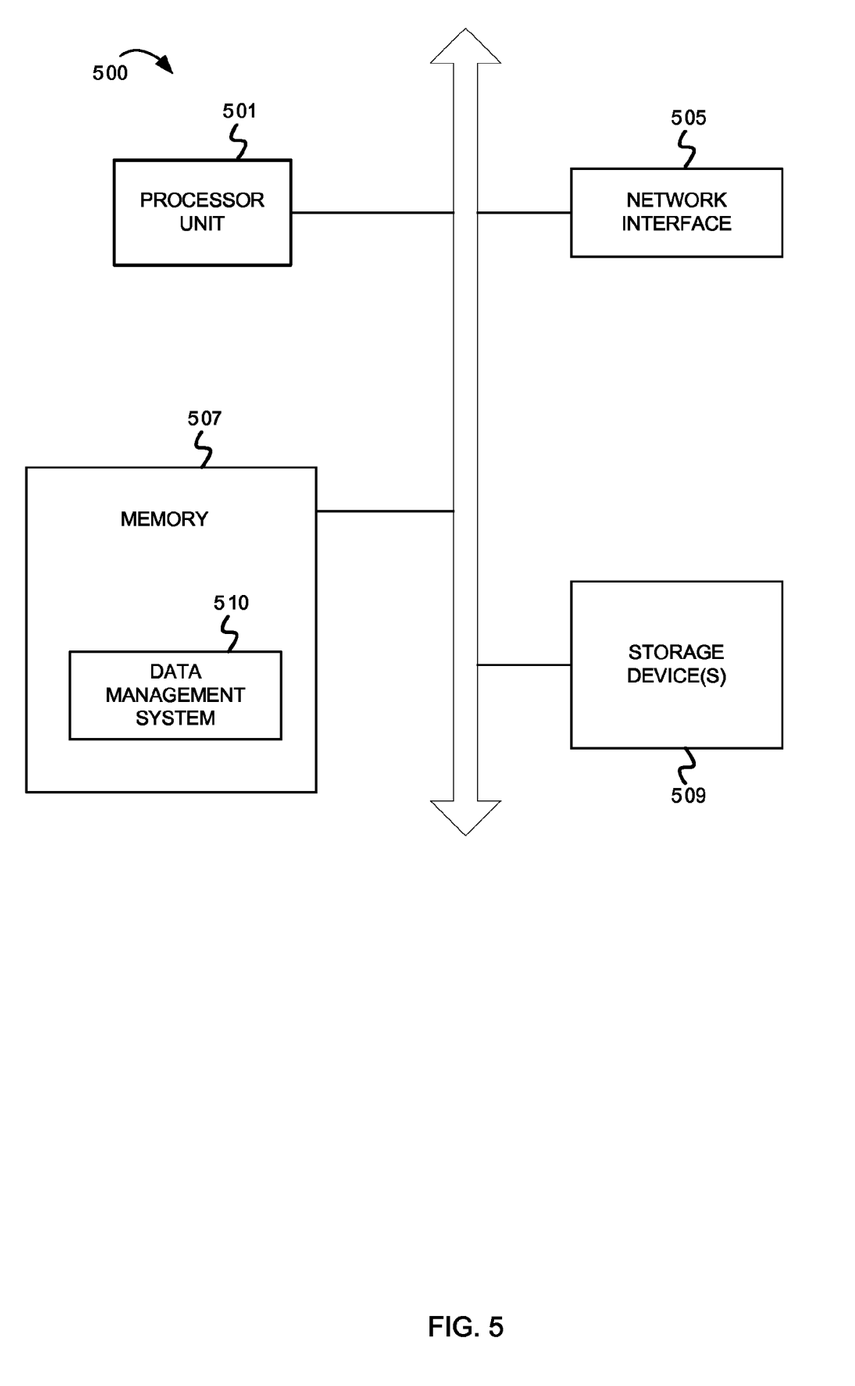
FIG. 5 depicts components of an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 includes a data management system 510 that includes functionality to implement embodiments described above. The system memory 507 may include some or all of the data management system and query optimizer functions described above. Alternatively, the functions of the data management system 510 or query optimizer described above may be distributed across multiple systems and system memories and may be loaded from one or more computer-readable media. Further, the data management system and query optimizer may be implemented with code embodied in co-processors, or on other hardware components such as cards, etc. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for executing queries in accordance with a deadline as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a query for data, the query including a deadline for completion;
   setting a maximum resource usage parameter for the query;
   determining a plurality of access plans for the query;
   determining if any of the plurality of access plans can complete the query prior to the deadline for completion without exceeding the maximum resource usage indicated by the maximum resource usage parameter;
   upon determining that no access plan can complete the query prior to the deadline for completion, increasing the maximum resource usage parameter for the query;
   determining a subset of the plurality of access plans that can be completed before the deadline for completion; and
   selecting an access plan from the subset of access plans, wherein the access plan is selected to provide a lowest resource usage among the subset of access plans that can be completed prior to the deadline for completion.

2. The method of claim 1, wherein selecting the access plan includes selecting the access plan with a lowest degree of parallelism among the access plans that can be completed prior to the deadline for completion.

3. The method of claim 1, wherein selecting the access plan includes selecting the access plan that has a lowest processor usage, memory usage, disk usage or network usage.

4. The method of claim 1, wherein determining the plurality of access plans for the query includes:
   creating an access plan for the query, the access plan comprising a sequential access plan;
   determining if the sequential access plan can be completed prior to the deadline; and
   upon determining that the sequential access plan cannot be completed prior to the deadline, iteratively adding one or more threads to the access plan until the access plan can be used to cause the query to complete prior to the deadline, the one or more threads comprising threads that are executed in parallel with at least one other thread in the access plan.

5. The method of claim 1, wherein the maximum resource usage parameter comprises a maximum parallelism parameter.

6. The method of claim 1, and further comprising returning an error indicating the query cannot be completed prior to the deadline if the maximum resource usage parameter exceeds a maximum threshold.

7. The method of claim 1, wherein receiving the query for data includes receiving a SQL statement defining the query, the SQL statement including the deadline for completion.

8. The method of claim 1, wherein the deadline for completion is included as a parameter of an API function invoked by a query source to supply the query to a data management system.

* * * * *